(12) United States Patent
Su et al.

(10) Patent No.: US 10,026,409 B2
(45) Date of Patent: Jul. 17, 2018

(54) STEREO-PHONIC FREQUENCY MODULATION RECEIVER AND METHOD FOR SEPARATING DUAL SOUND CHANNELS

(71) Applicant: MStar Semiconductor, Inc., Hsinchu Hsien (TW)

(72) Inventors: Yu-Che Su, Hsinchu Hsien (TW); Kuan-Chou Lee, Hsinchu Hsien (TW); Tai-Lai Tung, Hsinchu Hsien (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 15/405,643

(22) Filed: Jan. 13, 2017

(65) Prior Publication Data

US 2018/0018976 A1    Jan. 18, 2018

(30) Foreign Application Priority Data

Jul. 14, 2016   (TW) .............................. 105122187 A (51) Int. Cl.
| | |
|---|---|
| *H04H 20/47* | (2008.01) |
| *H04H 20/48* | (2008.01) |
| *G10L 19/008* | (2013.01) |
| *H04S 1/00* | (2006.01) |
| *G10L 19/26* | (2013.01) |
| *H04B 1/16* | (2006.01) |

(52) U.S. Cl.
CPC ............ *G10L 19/008* (2013.01); *H04S 1/007* (2013.01); *G10L 19/265* (2013.01); *H04B 1/1669* (2013.01); *H04B 1/1676* (2013.01); *H04H 20/47* (2013.01); *H04H 20/48* (2013.01)

(58) Field of Classification Search
CPC ... G10L 19/008; G10L 19/265; H04B 1/1669; H04B 1/1676; H04H 20/49; H04H 20/48; H04H 20/47; H03G 3/345; H04S 1/007
USPC .............................. 381/2; 375/350, 227, 347
See application file for complete search history.

(56) References Cited

U.S. PATENT DOCUMENTS 4,653,095 A * 3/1987 Kahn ..................... H04H 20/49
                                                       381/13
5,249,233 A * 9/1993 Kennedy ................ H03G 3/342
                                                       381/13

(Continued)

FOREIGN PATENT DOCUMENTS

| CN | 103888159 A | 6/2014 |
|---|---|---|
| TW | 201208264 A | 2/2012 |

*Primary Examiner* — Vivian Chin
*Assistant Examiner* — Ubachukwu Odunukwe
(74) *Attorney, Agent, or Firm* — Edell, Shapiro & Finnan, LLC (57) ABSTRACT

A stereo-phonic frequency modulation receiver includes: a frequency modulation demodulation circuit, receiving a reception signal, and generating a demodulated signal according to the reception signal; a frequency-division demultiplexer, generating a sum signal, a difference signal and a pilot amplitude signal according to the demodulated signal; a dual sound channel separation circuit, generating a left-channel output signal and a right-channel output signal according to the sum signal and a weakened difference signal; and a weakening circuit, weakening the difference signal according to the pilot amplitude signal or a signal-to-noise ratio (SNR) to generate the weakened difference signal.

8 Claims, 8 Drawing Sheets

(56) References Cited

U.S. PATENT DOCUMENTS

| | | | | |
|---|---|---|---|---|
| 2004/0190659 A1* | 9/2004 | Raj | ........................ | H03G 3/345 |
| | | | | 375/350 |
| 2011/0250859 A1* | 10/2011 | Gu | ........................ | H04B 1/1669 |
| | | | | 455/214 |
| 2013/0195164 A1* | 8/2013 | Chen | .................... | H04B 1/1676 |
| | | | | 375/227 |

* cited by examiner

STEREO-PHONIC FREQUENCY MODULATION RECEIVER AND METHOD FOR SEPARATING DUAL SOUND CHANNELS

This application claims the benefit of Taiwan application Serial No. 105122187, filed Jul. 14, 2016, the subject matter of which is incorporated herein by reference.

BACKGROUND OF THE INVENTION

Field of the Invention

The invention relates in general to a stereo-phonic frequency modulation receiver and a method for separating dual sound channels, and more particularly to a stereo-phonic frequency modulation receiver and a method for separating dual sound channels capable of increasing separation of left and right sound channels.

Description of the Related Art

Stereo-phonic frequency modulation systems are extensively applied in the daily life. In general, a stereo-phonic frequency modulation system uses a pilot signal to separate a left-channel signal and a right-channel signal from a demodulated signal. In practice, the signal quality of the pilot signal may become degraded due to external environmental factors, or an overall signal-to-noise ratio (SNR) may become unsatisfactory also due to external environmental factors, such that the stereo-phonic frequency modulation system cannot accurately shift the stereo audio to a frequency band of baseband, which then incurs a frequency offset. As a result, the stereo-phonic frequency modulation receiver is unable to accurately separate left-channel and right-channel signals, and the separation between left and right sound channels is thus reduced.

Therefore, there is a need for a solution that reduces the effect caused by the above frequency offset to further enhance the separation between left and right sound channels.

SUMMARY OF THE INVENTION

The invention is directed to a stereo-phonic frequency modulation system and a method for separating dual sound channels to improve issues of the prior art.

The present invention discloses a stereo-phonic frequency modulation receiver. The stereo-phonic frequency modulation receiver includes: a frequency modulation demodulation circuit, receiving a reception signal, and generating a demodulated signal according to the reception signal; a frequency-division demultiplexer, generating a sum signal, a difference signal and a pilot amplitude signal according to the demodulated signal, wherein the sum signal is associated with a sum of a left-channel signal and a right-channel signal, and the difference signal is associated with a difference between the left-channel signal and the right-channel signal; a dual sound channel separation circuit, generating a left-channel output signal and a right-channel output signal according to the sum signal and a weakened difference signal; and a weakening circuit, coupled between the frequency-division demultiplexer and the dual sound channel separation circuit, weakening the difference signal to generate the weakened difference signal.

The present invention further discloses a method for separating dual sound channels for a stereo-phonic frequency modulation receiver. The method includes: receiving a sum signal, a difference signal and a pilot amplitude signal from a frequency-division demultiplexer, wherein the sum signal is associated with a sum of a left-channel signal and a right-channel signal, and the difference signal is associated with a difference between the left-channel signal and the right-channel signal; weakening the difference signal according to the pilot amplitude signal or a signal-to-noise ratio (SNR) to generate a weakened difference signal; and generating a left-channel output signal and a right-channel output signal according to the sum signal and the weakened difference signal.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
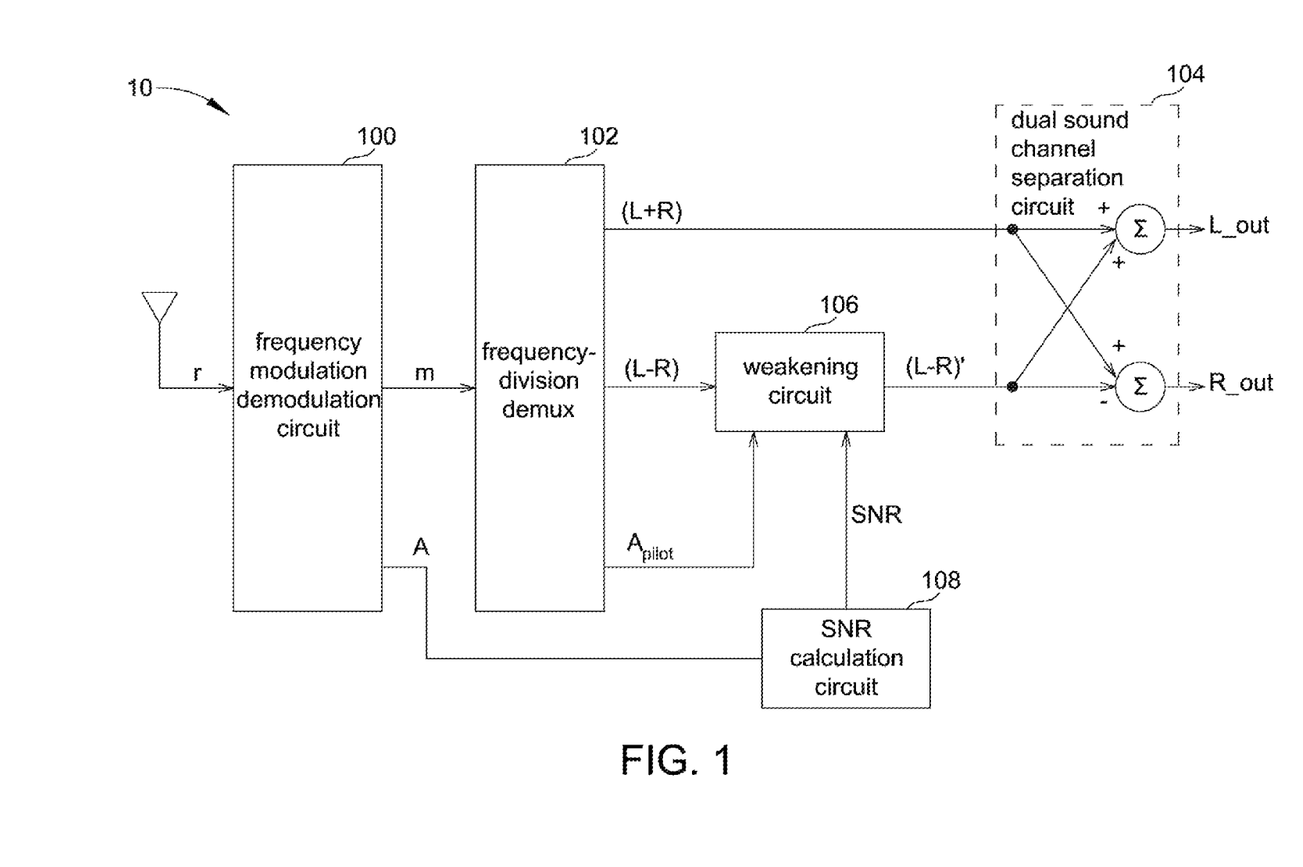
FIG. 1 is a block diagram of a stereo-phonic frequency modulation receiver according to an embodiment of the present invention.

FIG. 1 shows a block diagram of a stereo-phonic frequency modulation receiver 10 according to an embodiment of the present invention. The stereo-phonic frequency modulation receiver 10 includes a frequency modulation demodulation circuit 100, a frequency-division demultiplexer (demux) 102, a dual sound channel separation circuit 104, a weakening circuit 106 and a signal-to-noise ratio (SNR) calculation circuit 108. The frequency modulation demodulation circuit 100 receives a reception signal r, and generates a demodulated signal m and an amplitude signal A according to the reception signal r. The frequency-division demultiplexer 102 receives the demodulated signal m, and generates a sum signal (L+R), a difference signal (L−R) and a pilot amplitude signal $A_{pilot}$ according to the demodulated signal m. The SNR calculation circuit 108 receives the amplitude signal A, and generates an SNR according to the amplitude signal A. The sum signal (R+L) is received by the stereo-phonic frequency modulation receiver 10 and is associated with a sum of a left-channel signal L and a right-channel signal R. The difference signal (L−R) is received by the stereo-phonic frequency modulation receiver 10 and is associated with a difference between the left-channel signal L and the right-channel signal R. Further, the amplitude signal A corresponds to an amplitude of the reception signal r, and the pilot amplitude signal $A_{pilot}$ corresponds to an amplitude of a pilot signal $x_p$ in the demodulated signal m.

The weakening circuit 106, coupled between the frequency-division demultiplexer 102 and the dual sound channel separation circuit 104, receives the difference signal (L−R) and weakens the energy/amplitude of the difference signal (L−R) to generate a weakened difference signal (L−R)'. The dual sound channel separation circuit 104 generates a left-channel output signal L_out and a right-channel output signal R_out according to the sum signal (L+R) and the weakened difference signal (L−R)'. The left-channel output signal L_out may be represented as L_out=(L+R)+(L−R)', and the right-channel output signal R_out may be represented as R_out=(L+R)−(L−R)'.

Figure 2:
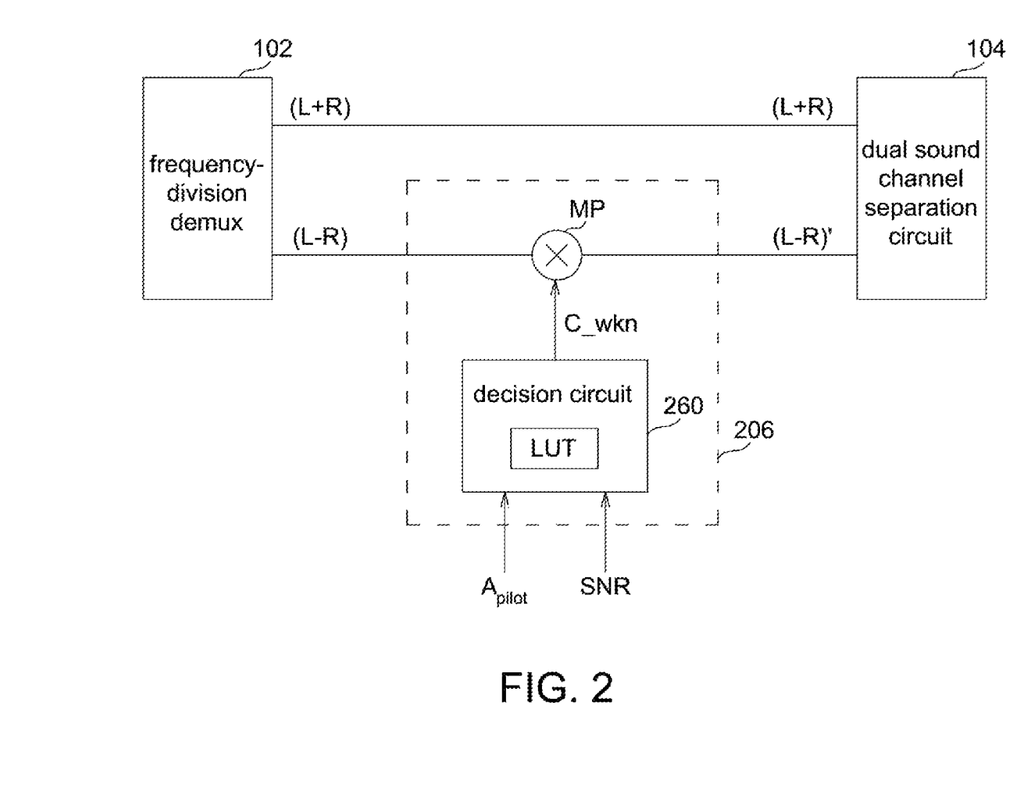
FIG. 2 is a block diagram of a weakening circuit according to an embodiment of the present invention.

More specifically, the weakening circuit 106 generates a weakening coefficient c_wkn according to the pilot amplitude signal $A_{pilot}$ or the signal-to-noise ratio SNR, and multiplies the difference signal (L−R) by the weakening coefficient c_wkn to generate the weakened difference signal (L−R)'. FIG. 2 shows a block diagram of a weakening circuit 206 according to an embodiment of the present invention. The weakening circuit 206 realizes the weakening circuit 106, and includes a decision circuit 260 and a multiplier MP. The decision circuit 260 receives the pilot amplitude signal $A_{pilot}$ and the signal-to-noise ratio SNR, and generates the weakening coefficient c_wkn according to the pilot amplitude signal $A_{pilot}$ or the signal-to-noise ratio SNR. The multiplier MP multiples the difference signal (L−R) by the weakening coefficient c_wkn to generate the weakened signal (L−R)', which may be represented by (L−R)'=c_wkn× (L−R), wherein the value of the weakening coefficient c_wkn may be between 0 and 1. It should be noted that, how the decision circuit 260 generates the weakening coefficient c_wkn according to the pilot amplitude signal $A_{pilot}$ or the signal-to-noise ratio SNR is not limited. In one embodiment, when the pilot amplitude signal $A_{pilot}$ is smaller than a threshold TH, the decision circuit 260 may generate the weakening coefficient c_wkn in a value 0, and the left-channel output signal L_out and the right-channel output signal R_out are both the sum signal (L+R) at this point. In another embodiment, the decision circuit 260 may generate the weakening coefficient c_wkn according to the signal-to-noise ratio SNR. More specifically, the decision circuit 260 may be stored with a look-up table LUT, in which a mapping relationship between the signal-to-noise ratio SNR and the weakening coefficient c_wkn is stored. When the decision circuit 260 receives the signal-to-noise ratio SNR, the decision circuit 260 may look up the weakening coefficient c_wkn corresponding to the signal-to-noise ratio SNR from the look-up table LUT, and output the weakening coefficient c_wkn to the multiplier MP. The mapping relationship between the signal-to-noise ratio SNR and weakening coefficient c_wkn may be adjusted based on system requirements or actual conditions, instead of being limited to a predetermined mapping relationship. For example, referring to Table I, when the signal-to-noise ratio SNR is greater than 30 dB, the decision circuit 260 may output the weakening coefficient c_wkn in a value 0.707; when the signal-to-noise ratio SNR is smaller than 18 dB, the decision circuit 260 may output the weakening coefficient c_wkn in a value 0.054; when the signal-to-noise ratio SNR is between 30 dB and 18 dB, the decision circuit 260 may output the weakening coefficient c_wkn that reduces as the signal-to-noise ratio SNR decreases.

TABLE I

| LUT | |
|---|---|
| SNR (dB) | c_wkn |
| >30 | 0.707 |
| 29 | 0.69966 |
| 28 | 0.55962 |
| 27 | 0.44766 |
| 26 | 0.3582 |
| 25 | 0.28656 |
| 24 | 0.22932 |
| 23 | 0.18342 |
| 22 | 0.1467 |
| 21 | 0.11736 |
| 20 | 0.09396 |
| 19 | 0.07506 |
| 18 | 0.06012 |
| <18 | 0.054 |

Figure 3:
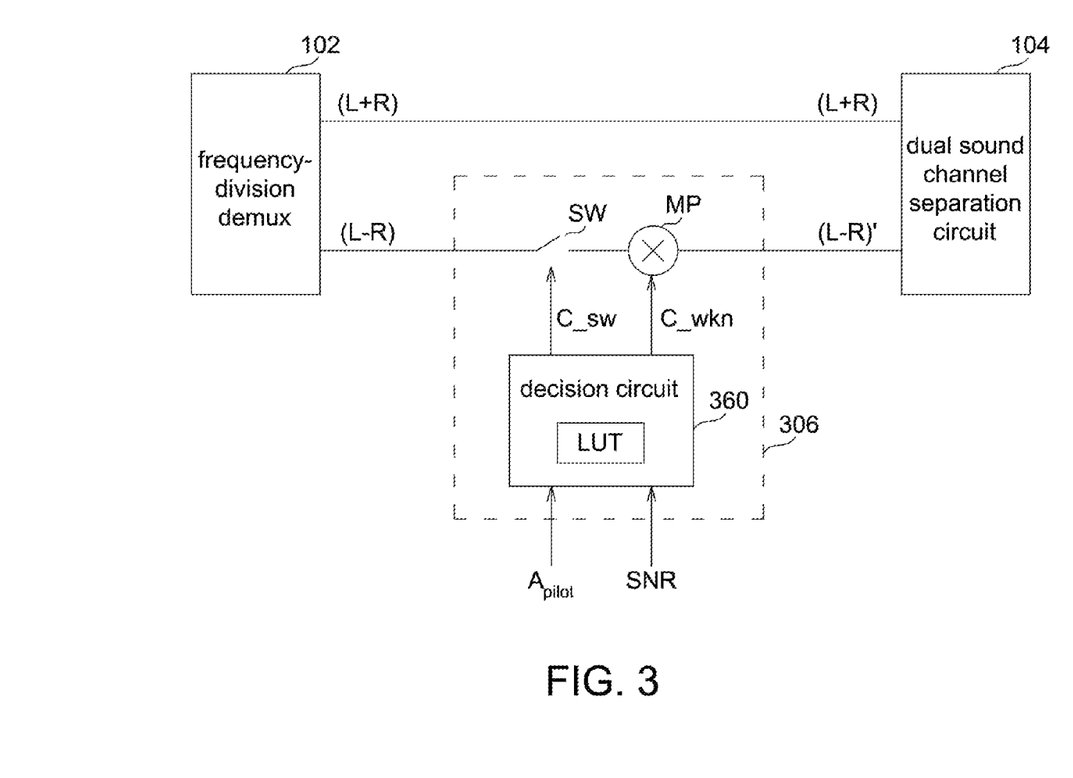
FIG. 3 is a block diagram of a weakening circuit according to an embodiment of the present invention.

It should be noted that, the weakening circuit is not limited to being implemented in the form shown in FIG. 2. FIG. 3 shows a block diagram of a weakening circuit 306 according to another embodiment of the present invention. The weakening circuit 306 is similar to the weakening circuit 206, and so the same elements use the same denotations. One difference from the weakening circuit 206 is that, the weakening circuit 306 further includes a switch SW. When the pilot amplitude signal $A_{pilot}$ is smaller than the threshold TH, a decision circuit 360 included in the weakening circuit 306 generates a switch control signal c_sw to cause the switch SW to be cutoff. At this point, the difference signal (L−R) cannot be transmitted to the dual sound channel separation circuit 104, and so both of the left-channel output signal L_out and the right-channel output signal R_out are the sum signal (L+R). When the pilot amplitude signal $A_{pilot}$ is greater than the threshold TH, the decision circuit 360 generates the switch control signal c_sw to cause the switch SW to be conducted, and the decision circuit 360 may then generate the weakening coefficient c_wkn according to the signal-to-noise ratio SNR. Associated operation details of the decision circuit 306 are similar to those of the decision circuit 260, and shall be omitted herein.

Figure 4:
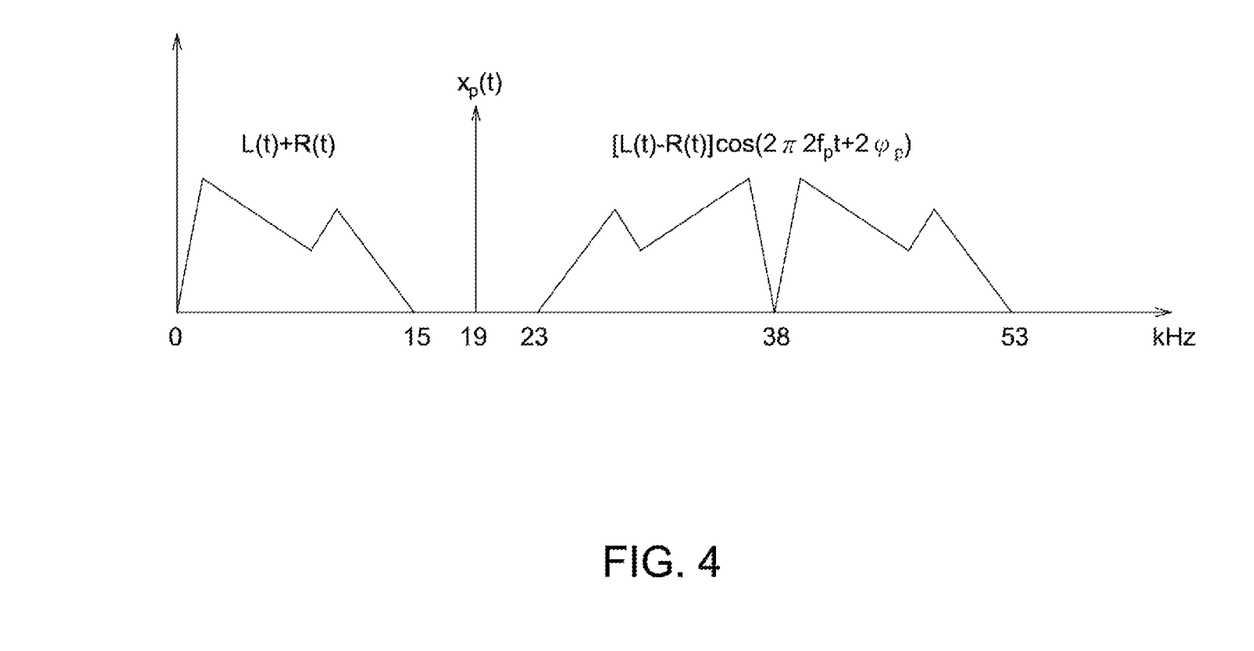
FIG. 4 is a schematic diagram of a spectrum of a demodulated signal.

Signal components and spectrum of the demodulated signal m are described in detail below. For a stereo-phonic frequency modulation system (given that channel response and noise are omitted), the time function of the demodulated signal m may be represented as m(t)=[L(t)+R(t)]+$x_p$(t)+[L(t)R(t)] $\cos(2\pi 2f_p t+2\varphi_p)$, where L(t) and R(t) respectively represent the time functions of the left-channel signal L and the right-channel signal R, $x_p$(t) is the time function of the pilot signal $x_p$, the pilot signal $x_p$(t) may be represented as $x_p$(t)=$A_p \cos(2\pi f_p t+\varphi_p)$, $A_p$, $f_p$ and $\varphi_p$ respectively represent the amplitude, frequency and phase of the pilot signal $x_p$(t), L(t)+R(t) represents the time function of the sum signal (L+R), and L(t)−R(t) represents the time function of the difference signal (L−R). Further, the spectrum of the demodulated signal m(t) may be as shown in FIG. 4. In general, the spectrum of L(t)+R(t) is substantially located between 0 KHz and 15 KHz, the spectrum of the pilot signal $x_p$(t) is substantially located at 19 KHz, and the spectrum of [L(t)−R(t)] $\cos(2\pi 2f_p t+2\varphi_p)$ is substantially located between 23 KHz and 53 KHz.

Figure 5:
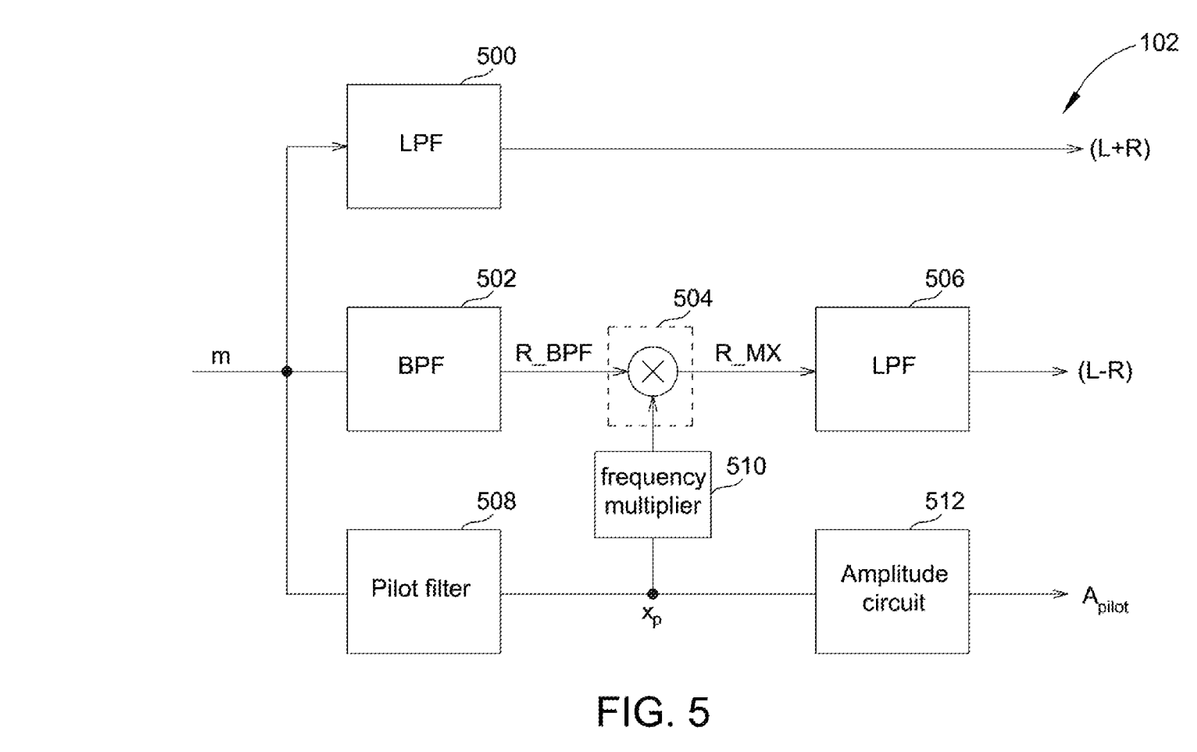
FIG. 5 is a block diagram of a frequency-division demultiplexer according to an embodiment of the present invention.

Details of the frequency-division demultiplexer 102 are given with reference to FIG. 5. FIG. 5 shows a block diagram of the frequency-division demultiplexer 102 according to an embodiment of the present invention. The frequency-division demultiplexer 102 includes a low-pass filter (LPF) 500, a band-pass filter (BPF) 502, a mixer 504, an LPF 506, a pilot filter 508, a frequency multiplier 510 and an amplitude circuit 512. The LPF 500 filters out the signal L(t)+R(t) located at 0 KHz to 15 KHz from the signal m(t) to obtain the sum signal (L+R). The pilot filter 508 filters out the pilot signal $x_p(t)$ from the signal m(t) to obtain the pilot signal $x_p$. The amplitude circuit 512 receives the pilot signal $x_p$, and generates the pilot amplitude signal $A_{pilot}$ corresponding to the pilot signal $x_p$. For example but not limited to, the amplitude circuit 512 may obtain the pilot amplitude signal $A_{pilot}$ by a coordinate rotation digital computer (CORDIC) algorithm according to the pilot signal $x_p$. The BPF 502 filters out the signal [L(t)−R(t)] $\cos(2\pi 2f_p t+2\varphi_p)$ located at 23 KHz to 53 KHz from the signal m(t) to generate a band-pass filtered result R_BPF. The frequency-division demultiplexer 102 generates a frequency multiplied signal (substantially located at 38 KHz) of the pilot signal $x_p$ by the frequency multiplier 510, generates a mixed result R_MX from multiplying the band-pass filtered result R_BPF by the frequency multiplied signal by the mixer 504, filters out high-frequency components from the mixed result R_MX by the LPF 506 to obtain the difference signal (L−R). In other words, the mixer 504 and the LPF 506 relocate [L(t)−R(t)] $\cos(2\pi 2f_p t+2\varphi_p)$ to a frequency band of baseband to obtain the difference signal (L−R).

Figure 6:
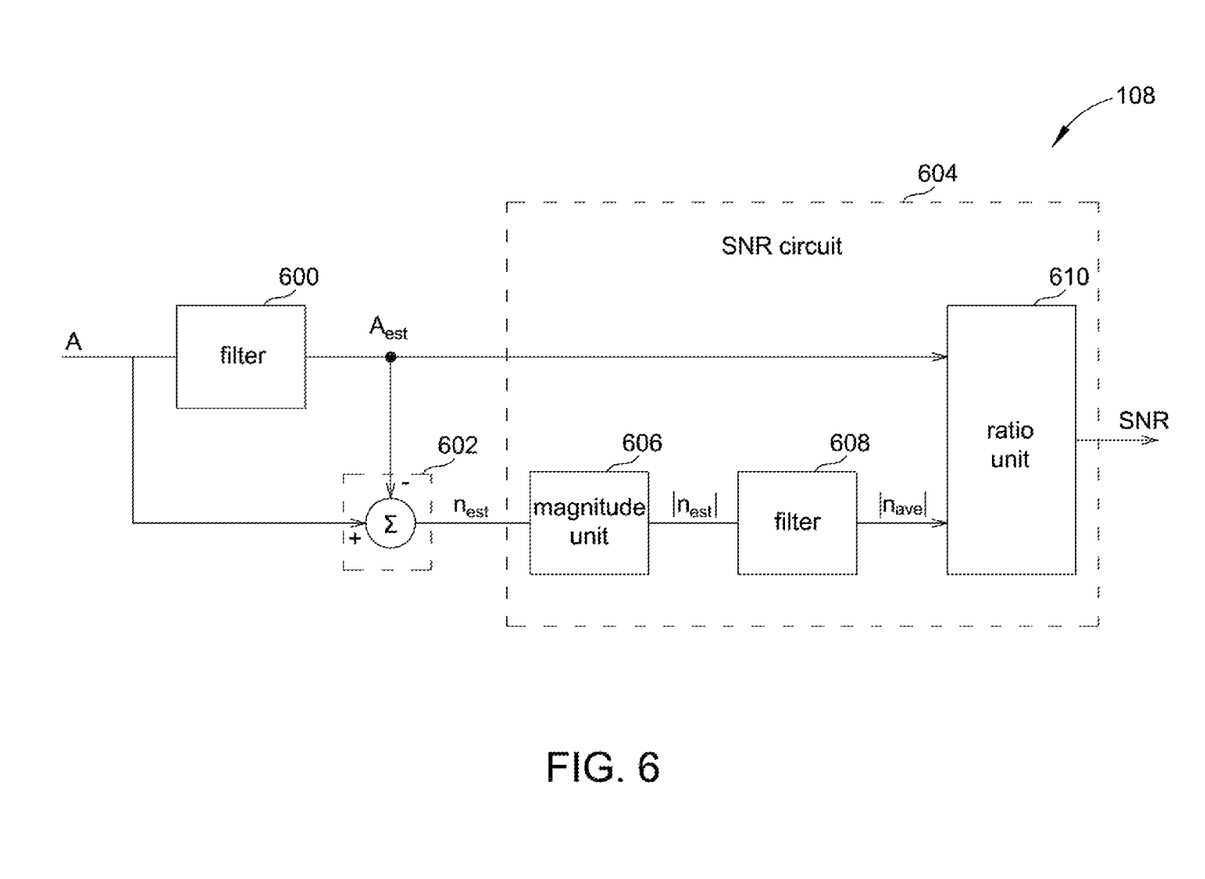
FIG. 6 is a block diagram of an SNR calculation circuit according to an embodiment of the present invention.

Details of the SNR calculation circuit 108 are given with reference to FIG. 6 below. FIG. 6 shows a block diagram of the SNR calculation circuit 108 according to an embodiment of the present invention. The SNR calculation circuit 108 includes a filter 600, a subtraction circuit 602 and an SNR circuit 604. The filter 600 is an LFP, which receives the amplitude signal A and performs a low-pass filter/average calculation on the amplitude signal A to filter out high-frequency components from the amplitude signal A to generate an estimated amplitude value $A_{est}$. The subtraction circuit 602 subtracts the estimated amplitude value $A_{est}$ from the amplitude signal A to generate an estimated SNR $n_{est}$. The SNR circuit 604 may include a magnitude unit 606, a filter 608 and a ratio unit 610. The magnitude unit 606 performs a magnitude calculation on the estimated SNR $n_{est}$ to obtain an SNR magnitude value $|n_{est}|$. The filter 608 is also an LPF, which performs a low-pass filter/average calculation on the SNR magnitude value $|n_{est}|$ to obtain a noise average $|n_{ave}|$. The ratio unit 610 receives the estimated amplitude value $A_{est}$ and the noise average $|n_{ave}|$ to calculate the signal-to-noise ratio SNR, which may be represented as SNR=$|A_{est}|^2/|n_{ave}|^2$. Thus, the SNR calculation circuit 108 outputs the calculated signal-to-noise ratio SNR to the weakening circuit 106 that then generates the weakening coefficient c_wkn according to the signal-to-noise ratio SNR.

Figure 7:
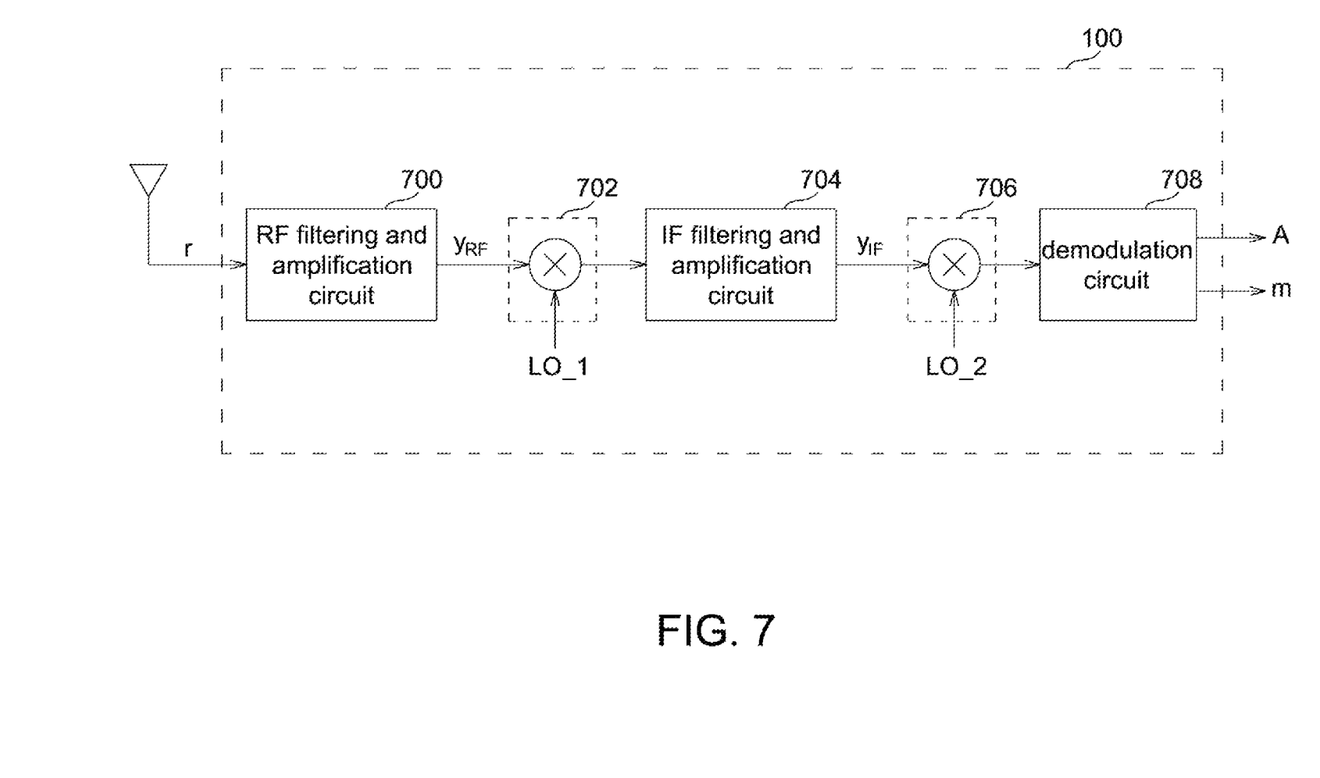
FIG. 7 is a block diagram of a frequency modulation demodulation circuit according to an embodiment of the present invention.

Details of the frequency modulation demodulation circuit 100 are given with reference to FIG. 7 below. FIG. 7 shows a block diagram of the frequency modulation demodulation circuit 100 according to an embodiment of the present invention. The frequency modulation demodulation circuit 100 may be a superheterodyne receiver, and includes a radio-frequency (RF) filtering and amplification circuit 700, an RF mixer 702, an intermediate-frequency (IF) filtering and amplification circuit 704, an IF mixer 706 and a demodulation circuit 708. The RF filtering and amplification circuit 700 filters out signal components at an RF band from the reception signal, and amplifies the signal components of the RF band to generate an RF signal $y_{RF}$. The RF mixer 702 and the IF filtering and amplification circuit 704 relocates the RF signal $y_{RF}$ of the RF band to an IF band using a first oscillation signal LO_1 to generate an IF signal $y_{IF}$. Further, the IF mixer 706 relocates the IF signal $y_{IF}$ to a band of baseband using a second oscillation signal LO_2. The demodulation circuit 708 then accordingly demodulates the signal m and the amplitude signal A.

It should be noted that, when the signal quality of the pilot signal $x_p$ is unsatisfactory (i.e., the pilot amplitude signal $A_{pilot}$ is smaller than the threshold TH) or the signal-to-noise ratio SNR is poor, the signal [L(t)−R(t)] $\cos(2\pi 2f_p t+2\varphi_p)$ cannot be effectively relocated to the band of baseband and a frequency offset is thus incurred. In this situation, when the signal quality of the pilot signal $x_p$ or the signal-to-noise ratio SNR of the pilot signal $x_p$ is unsatisfactory, the present invention uses the weakening circuit 106 to adaptively weaken (or even block) the difference signal (L−R), so as to reduce the effect of the difference signal (L−R) (having a frequency offset) upon the sum signal (L+R) to further enhance the separation between the left and right sound channels. Proven experimentally, the stereo-phonic frequency modulation receiver 10 achieves 40.6 dB separation between the left and right sound channels, whereas only 20 dB separation between left and right sound channels is provided by a conventional stereo-phonic frequency modulation receiver. In other words, the stereo-phonic frequency modulation receiver 10 achieves better separation between left and right sound channels.

One person skilled in the art can understand that, the function units/circuits in FIG. 1 to FIG. 3 and FIG. 5 to FIG. 7 may be realized or implemented by digital circuits (e.g., RTL circuits) or a digital signal processor (DSP), and associated details are omitted herein.

Figure 8:
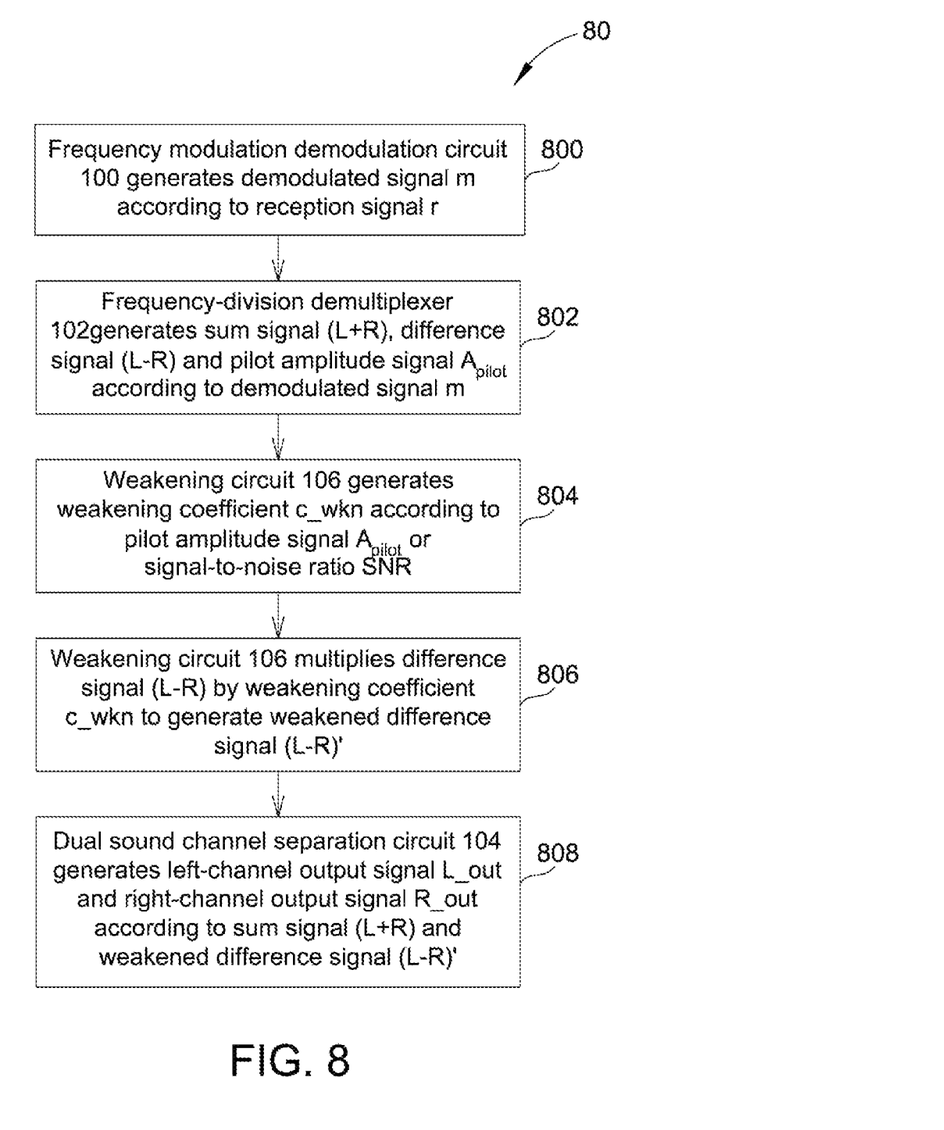
FIG. 8 is a flowchart of a method for separating dual sound channels according to an embodiment of the present invention.

Operation details of the stereo-phonic frequency modulation receiver 10 may be concluded into a dual sound channel separation process. FIG. 8 shows a flowchart of a dual sound channel separation method 80 according to an embodiment of the present invention. The dual sound channel separation method 80 may be performed by the stereo-phonic frequency modulation receiver 10, and includes following steps.

In step 800, the frequency modulation demodulation circuit 100 generates the demodulated signal m according to the reception signal.

In step 802, the frequency-division demultiplexer 102 generates the sum signal (L+R), the difference signal (L−R) and the pilot amplitude signal $A_{pilot}$ according to the demodulated signal m.

In step 804, the weakening circuit 106 generates the weakening coefficient c_wkn according to the pilot amplitude signal $A_{pilot}$ or the signal-to-noise ratio SNR.

In step 806, the weakening circuit 106 multiples the difference signal (L−R) by the weakening coefficient c_wkn to generate the weakened difference signal (L−R)'.

In step 808, the dual sound channel separation circuit 104 generates the left-channel output signal L_out and the right-channel output signal R_out according to the sum signal (L+R) and the weakened difference signal (L−R)'.

Operation details may be referred from the description in the above paragraphs, and shall be omitted herein.

Therefore, as demonstrated, the present invention adaptively weakens the difference signal when the signal quality of the signal-to-noise ratio of a pilot signal is unsatisfactory to reduce the effect of the difference signal having a frequency offset, and to further enhance the separation between the left and right sound channels.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A stereo-phonic frequency modulation receiver, comprising:
   a frequency modulation demodulation circuit, receiving a reception signal, and generating a demodulated signal according to the reception signal;
   a frequency-division demultiplexer, generating a sum signal, a difference signal and a pilot amplitude signal according to the demodulated signal, wherein the sum signal is associated with a sum of a left sound channel and a right sound channel, and the difference signal is associated with a difference between the left sound channel and the right sound channel;
   a dual sound channel separation circuit, generating a left-channel output signal and a right-channel output signal according to the sum signal and a weakened difference signal; and
   a weakening circuit, coupled between the frequency-division demultiplexer and the dual sound channel separation circuit, weakening the difference signal according to the pilot amplitude signal or a signal-to-noise ratio (SNR) to generate the weakened difference signal,
   wherein the frequency-division demultiplexer comprises:
   a first low-pass filter (LPF), receiving the demodulated signal and generating the sum signal;
   a frequency multiplier, generating a frequency multiplied signal according to an oscillation signal;
   a band-pass filter (BPF), receiving the demodulated signal and generating a band-pass filtered result;
   a mixer, generating a mixed result according to the frequency multiplied signal and the band-pass filtered result;
   a second LPF, receiving the mixed result and generating the difference signal; and
   an amplitude circuit, generating the pilot amplitude signal according to the pilot signal.

2. The stereo-phonic frequency modulation receiver according to claim 1, wherein the weakening circuit comprises a switch coupled between the frequency-division demultiplexer and the dual sound channel separation circuit, and the weakening circuit controls the switch to be cutoff when the pilot amplitude signal is smaller than a threshold.

3. The stereo-phonic frequency modulation receiver according to claim 1, wherein the weakening circuit comprises:
   a decision circuit, generating a weakening coefficient according to the pilot amplitude signal and or the SNR; and
   a multiplier, multiplying the difference signal by the weakening coefficient to generate the weakened difference signal.

4. The stereo-phonic frequency modulation receiver according to claim 3, wherein the weakening circuit generates the weakening coefficient in a value 0 when the pilot amplitude signal is smaller than a threshold.

5. The stereo-phonic frequency modulation receiver according to claim 3, wherein the weakening coefficient decreases as the SNR lowers.

6. The stereo-phonic frequency modulation receiver according to claim 3, wherein the decision circuit stores a mapping table that stores a mapping relationship between the SNR and the weakening coefficient.

7. The stereo-phonic frequency modulation receiver according to claim 1, further comprising:
   an SNR calculation circuit, coupled to the frequency modulation demodulation circuit, calculating the SNR according to an amplitude signal generated by the frequency modulation demodulation circuit, comprising:
   a filter, receiving the amplitude signal and generating an estimated amplitude value;
   a subtraction circuit, subtracting the estimated amplitude value from the amplitude signal to generate an estimated SNR; and
   an SNR circuit, calculating the SNR according to the estimated amplitude value and the estimated SNR.

8. The stereo-phonic frequency modulation receiver according to claim 1, wherein the frequency modulation demodulation circuit comprises a superheterodyne receiver.

* * * * *